United States Patent
Kebler et al.

(10) Patent No.: US 10,104,139 B2
(45) Date of Patent: Oct. 16, 2018

(54) SELECTIVELY SIGNALING SELECTIVE TUNNELS IN MULTICAST VPNS

(71) Applicant: Juniper Networks, Inc., Sunnyvale, CA (US)

(72) Inventors: Robert W. Kebler, Newburyport, MA (US); Vikram Nagarajan, Chennai (IN); Sunil Kumar, Bangalore (IN); Sanoj Kadavil Vivekanandan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 224 days.

(21) Appl. No.: 15/086,897

(22) Filed: Mar. 31, 2016

(65) Prior Publication Data
US 2017/0289217 A1  Oct. 5, 2017

(51) Int. Cl.
| | |
|---|---|
| H04L 29/06 | (2006.01) |
| H04L 12/751 | (2013.01) |
| H04L 12/911 | (2013.01) |
| H04L 12/18 | (2006.01) |
| H04L 12/761 | (2013.01) |

(52) U.S. Cl.
CPC ...... *H04L 65/4076* (2013.01); *H04L 12/1886* (2013.01); *H04L 45/02* (2013.01); *H04L 45/16* (2013.01); *H04L 47/825* (2013.01)

(58) Field of Classification Search
None
See application file for complete search history.

(56) References Cited

U.S. PATENT DOCUMENTS

| | | | | |
|---|---|---|---|---|
| 2011/0032945 | A1* | 2/2011 | Mullooly | H04L 45/58 370/401 |
| 2013/0322291 | A1* | 12/2013 | Venkataraman | H04L 47/125 370/254 |
| 2014/0029419 | A1* | 1/2014 | Jain | H04L 41/0668 370/228 |

OTHER PUBLICATIONS

RFC 6514, "BGP Encodings and Procedures for Multicast in MPLS/BGP IP VPNs", Feb. 2012.*
Rosen et al., "Multicast in MPLS/BGP IP VPNs, draft-ietf-l3vpn-2547bis-mcast-07.txt," Internet-Draft, Network Working Group, Jul. 9, 2008, 92 pp.

(Continued)

*Primary Examiner* — James P Duffy
(74) *Attorney, Agent, or Firm* — Shumaker & Sieffert, P.A.

(57) ABSTRACT

In some examples, a method includes receiving, by a first ingress network device for a network, a source tree join route message from an egress network device for the network, specifying a multicast source and a multicast group, and in response to receiving the source tree join route message, determining, by the ingress network device, whether the multicast source is multi-homed to the network via the first ingress network device and a second ingress network device for the network. The method includes, in response to determining that the multicast source is not multi-homed, forwarding traffic for the multicast source on an inclusive provider tunnel without initiating setup of a selective provider tunnel to the egress network device, and in response to determining that the multicast source is multi-homed, initiating setup of a selective provider tunnel to the egress network device and terminating forwarding multicast traffic on the inclusive provider tunnel.

19 Claims, 4 Drawing Sheets

(56) References Cited

OTHER PUBLICATIONS

Aggarwal et al., "BGP Encodings and Procedures for Multicast in MPLS/BGP IP VPNs, draft-ietf-l3vpn-2547bis-mcast-bgp-04.txt," Internet-Draft, Network Working Group, Nov. 2007, 50 pp.
Extended Search Report from counterpart European Application No. 17164237.4, dated Aug. 28, 2017, 12 pp.
Aggarwal et al., "BGP Encodings for Multicast in MPLS/BGP IP VPNs," Network Working Group Internet Draft, draft-ietf-l3vpn-2547bis-mcast-bgp-00.txt, Jul. 2006, 45 pp.
Adams et al., "Protocol Independent Multicast—Dense Mode (PIM-DM): Protocol Specification (Revised)," RFC 3973, Network Working Group, Jan. 2005, 61 pp.
Fenner et al., "Protocol Independent Multicast—Sparse Mode (PIM-SM): Protocol Specification (Revised)," RFC 4601, Network Working Group, Aug. 2006, 112 pp.
Holbrook et al., "Source-Specific Multicast for IP," RFC 4607, Network Working Group, Aug. 2006, 19 pp.
Handley et al., "Bidirectional Protocol Independent Multicast (BIDIR-PIM)," RFC 5015, Network Working Group, Oct. 2007, 43 pp.
Rosen et al., "Multicast in MPLS/BGP IP VPNs," RFC 6513, Internet Engineering Task Force (IETF), Feb. 2012, 88 pp.
Aggarwal et al., "BGP Encodings and Procedures for Multicast in MPLS/BGP IP VPNs," RFC 6514, Internet Engineering Task Force (IETF), Feb. 2012, 59 pp.
"NG MVPN BGP Route Types and Encodings," Application Note, Juniper Networks, Inc., Apr. 2009, 5 pp.
Singh, "NG MVPN-Control Plane Overview," packetpushers.net, Dec. 3, 2014, 23 pp.
Response filed Apr. 4, 2018 to the Extended Search Report from counterpart European Application No. 17164237.4, dated Aug. 28, 2017, 25 pp.

* cited by examiner

SELECTIVELY SIGNALING SELECTIVE TUNNELS IN MULTICAST VPNS

TECHNICAL FIELD

The disclosure relates to computer networks and, more particularly, to distribution of multicast traffic over computer networks.

BACKGROUND

A computer network is a collection of interconnected computing devices that exchange data and share resources. In a packet-based network the computing devices communicate data by dividing the data into small blocks called packets. Certain devices within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. For example, the computer network may utilize protocol independent multicast (PIM) as a multicast routing protocol to build distribution trees through the computer network for the transmission of multicast traffic between sources and receivers within customer sites for particular multicast groups. PIM may operate in several different modes, including Dense Mode (DM), Sparse Mode (SM) in Source-Specific Multicast (SSM) mode or Any Source Multicast (ASM) mode, and Bidirectional (BIDIR) mode.

In addition, the computer network may be configured to support multicast VPNs (MVPNs) to enable Internet Protocol (IP) multicast traffic to travel between sources and receivers within customer sites. For one or more MVPNs, provider edge (PE) routers coupled to the customer sites may conceptually build a multicast tree to carry multicast traffic from a multicast source through the public network so that the customer sites receive the multicast traffic as if the customer sites were directly attached to the same private network as the source.

SUMMARY

In general, this disclosure describes techniques for selectively signaling selective provider tunnels in MVPNs. The disclosed techniques may be used in a scenario where an MVPN network is configured to use selective provider tunnels for forwarding multicast traffic within the MVPN network from ingress network devices to egress network devices. Selective provider tunnels between ingress and egress network devices operate such that traffic sent by a particular provider edge (PE) router is delivered to subset of PE routers in a given MVPN instance, rather than to all PE routers in the MVPN instance. Inclusive provider tunnels between ingress and egress network devices operate such that any multicast packet sent towards a core network will be received by all the PE routers connected to core network for that MVPN irrespective of whether the PE routers have interested listeners (receivers).

The techniques of this disclosure provide the ability for ingress network devices to the MVPN network to determine whether there are already one or more other ingress network devices capable of forwarding traffic for the particular multicast source and multicast group (i.e., the multicast source is multi-homed to the MVPN network via multiple ingress network devices), and based on this detection, switching from inclusive provider tunnels to the selective provider tunnels only as needed. The ingress network devices receive multicast traffic from outside MPLS core network (initiated by a multicast source) and forward the multicast traffic into MPLS core network toward multicast receivers. The egress network devices receive the multicast traffic from the network and forward the multicast traffic towards multicast receivers external to the network.

According to the disclosed techniques, an ingress network device (such as a PE router) is configured to, in response to receiving a source tree join route message from an egress network device of the network that specifies a multicast source, determine whether there has already been a source active auto-discovery route message received for the multicast source of the multicast group (multicast flow). The ingress PE router is configured such that if the ingress PE router determines it is singly-homed to the multicast source for this multicast group (e.g., no source active auto-discovery route message has yet been received), the ingress PE router will remain in an inclusive provider tunnel mode without initiating setup of a selective provider tunnel. If the ingress PE router determines it is multi-homed to the multicast source for this multicast group (a source active auto-discovery route message was already received), only then will the ingress PE router initiate setup of a selective provider tunnel.

Selectively signaling the setup of selective provider tunnels only when the ingress network device determines that the multicast source and group is multi-homed, rather than setting up selective tunnels in all cases, may provide certain advantages. For example, these techniques may reduce the amount of state stored by the network devices, providing a more scalable approach and improve the functioning of the network devices such as by preserving computing resources for other purposes.

In one example aspect, a method includes receiving, by a first ingress network device for a network, a source tree join route message from an egress network device for the network, the source tree join route message specifying a multicast source and a multicast group, in response to receiving the source tree join route message, determining, by the ingress network device, whether the multicast source is multi-homed to the network via the first ingress network device and a second ingress network device for the network, in response to determining that the multicast source is not multi-homed to the network, forwarding, by the first ingress network device, multicast traffic for the multicast source and multicast group on an inclusive provider tunnel without initiating setup of a selective provider tunnel to the egress network device, and in response to determining that the multicast source is multi-homed to the network, initiating, by the first ingress network device, setup of a selective provider tunnel to the egress network device and terminating forwarding the multicast traffic on the inclusive provider tunnel to the egress network device.

In another example aspect, a network device includes at least one computer processor, and a memory comprising instructions that when executed by the at least one computer processor cause the at least one computer processor to: receive a source tree join route message from an egress network device for a network, the source tree join route message specifying a multicast source and a multicast group, in response to receiving the source tree join route message, determine whether the multicast source is multi-homed to the network via the network device as a first ingress network device for the network and a second ingress network device for the network, in response to determining that the multicast source is not multi-homed to the network, forward multicast traffic for the multicast source and multicast group on an inclusive provider tunnel without initiating setup of a selective provider tunnel to the egress network device, and in response to determining that the multicast source is multi-homed to the network, initiate setup of a selective provider tunnel to the egress network device and terminate forwarding the multicast traffic on the inclusive provider tunnel to the egress network device.

In a further example aspect, a non-transitory computer-readable storage medium is encoded with instructions that, when executed, cause at least one processor of a computing device to: receive a source tree join route message from an egress network device for a network, the source tree join route message specifying a multicast source and a multicast group, in response to receiving the source tree join route message, determine whether the multicast source is multi-homed to the network via the computing device as a first ingress network device for the network and a second ingress network device for the network, in response to determining that the multicast source is not multi-homed to the network, forward multicast traffic for the multicast source and multicast group on an inclusive provider tunnel without initiating setup of a selective provider tunnel to the egress network device, and in response to determining that the multicast source is multi-homed to the network, initiate setup of a selective provider tunnel to the egress network device and terminate forwarding the multicast traffic on the inclusive provider tunnel to the egress network device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
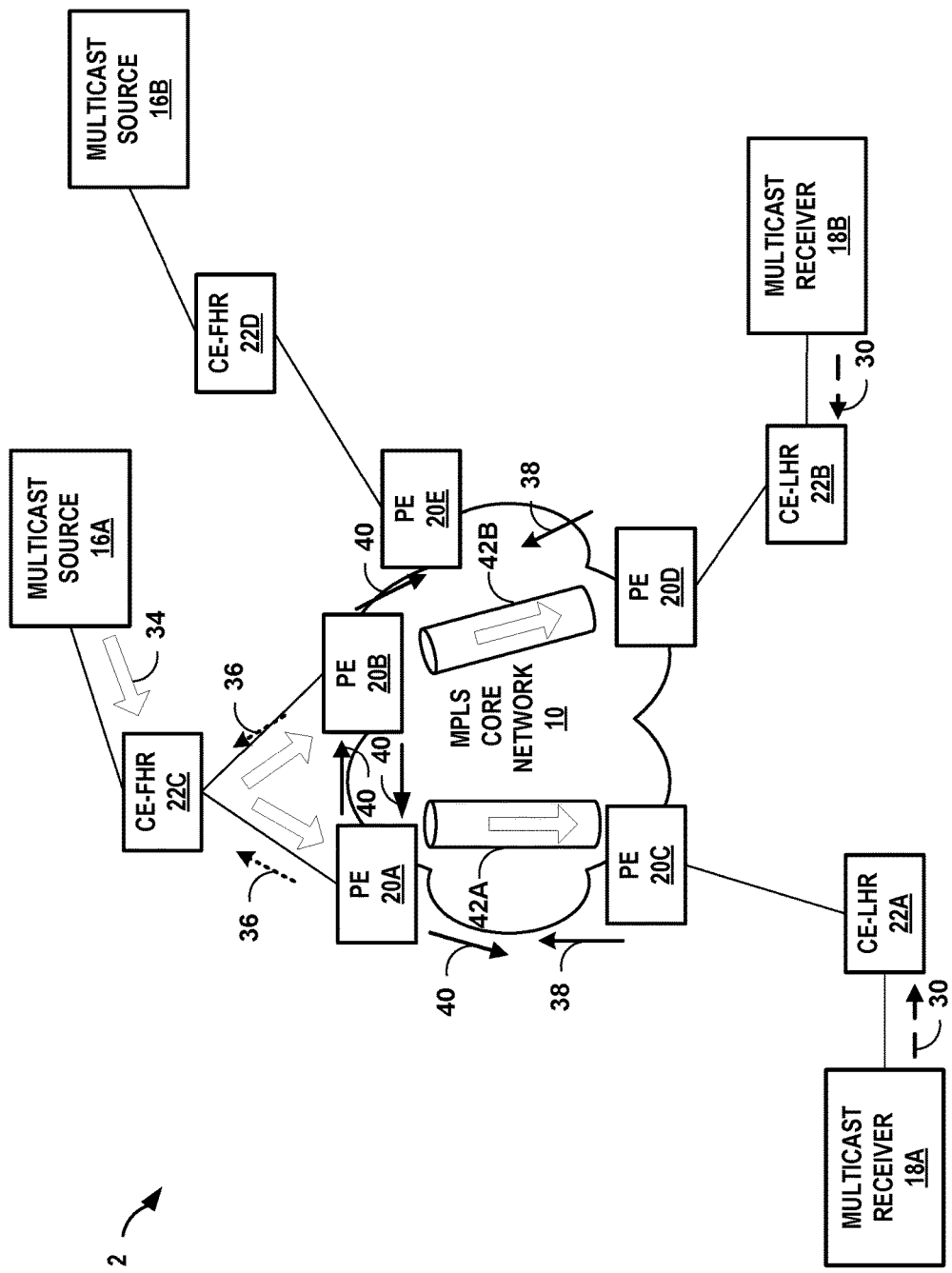
FIGS. 1 and 2 are block diagrams illustrating an example computer network including network devices configured to transmit multicast traffic between one or more multicast sources and multicast receivers.
Figure 2:
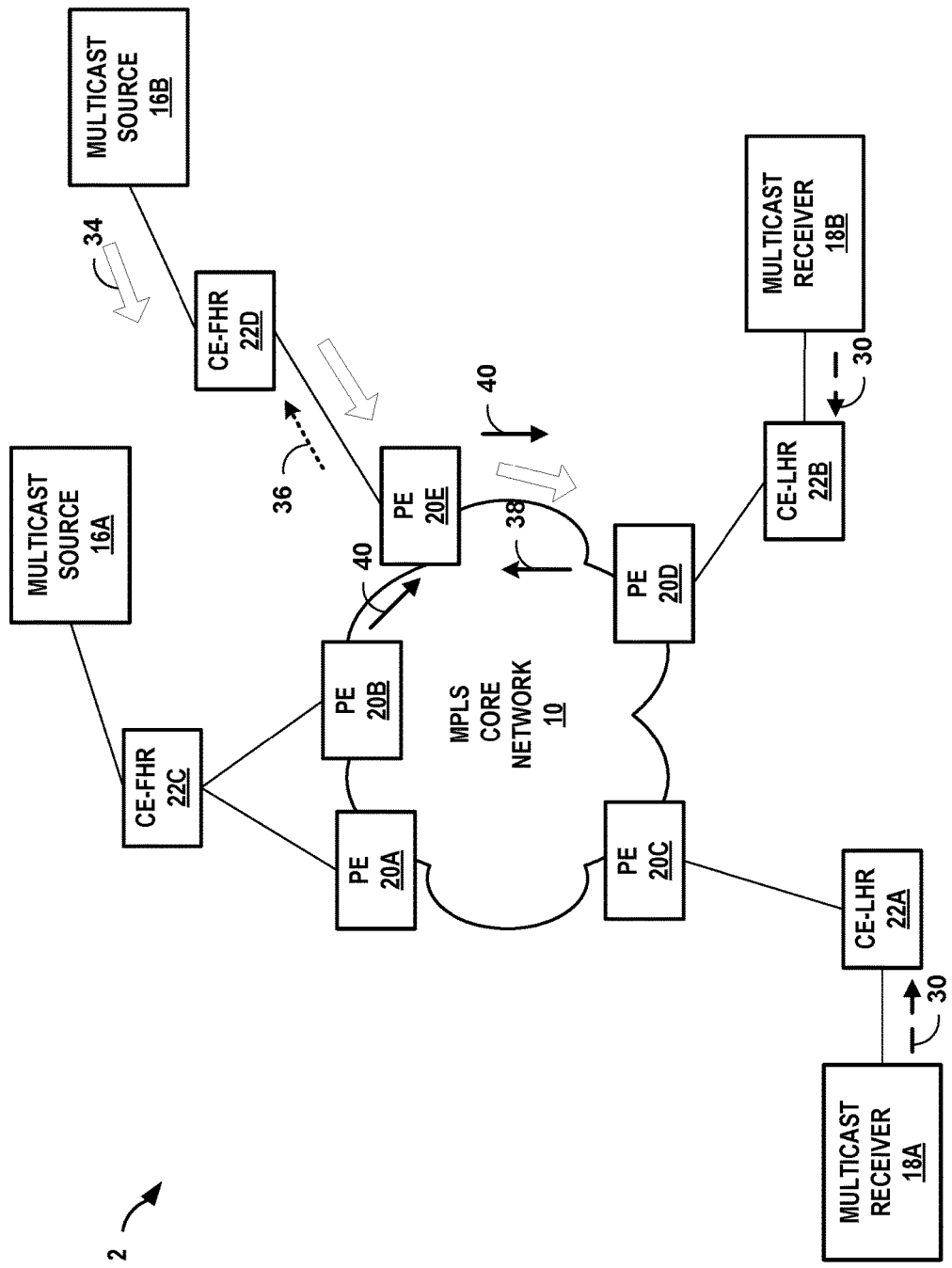

FIGS. 1 and 2 are block diagrams illustrating an example computer network 2 including network devices configured to transmit multicast traffic between one or more multicast sources 16A-16B ("multicast sources 16") and multicast receivers 18A-18B ("multicast receivers 18"). In particular, FIGS. 1 and 2 are block diagrams illustrating a network having network devices configured for selectively switching from using inclusive provider tunnel to selective provider tunnels based on, as one example, detecting receipt of a source active auto-discovery route message indicating that another ingress PE router for the network has discovered the multicast source, in accordance with the techniques of this disclosure. FIG. 1 illustrates a first example in which ingress PE routers 20A, 20B are configured to selectively switch to use of selective tunnels upon detecting that multicast source 16A is multi-homed and currently delivering multicast traffic to at least one of the ingress PE routers providing multi-homed connectivity. FIG. 2 illustrates another example in which ingress PE router 20E continues to use inclusive tunnels based on detecting absence of other PE routers to providing multi-homed connectivity for multicast source 16B.

Network 2 may comprise a private network or a public network, such as the Internet. For example, network 2 may be an enterprise network, a campus network, a service provider network, a home network, a local area network (LAN), a virtual local area network (VLAN), virtual private network (VPN), or another autonomous system. In any of these examples, remotely located multicast sources 16 and multicast receivers 18 may share data via network 10. In an example of network 2 as an enterprise network, each of multicast sources 16 and multicast receivers 18 may comprise one or more servers or employee computer terminals located in different regions of a single office location, or may comprise a remote office location of a corporation.

In the example illustrated in FIG. 1, multicast sources 16 may each provide multicast traffic for one or more multicast groups, and receivers 18 may request or subscribe to traffic from one or more multicast groups. Multicast sources 16 may also referred to herein as "customer sources (C-sources) ." Receivers 18 may comprise Internet Group Management Protocol (IGMP) hosts interested in receiving multicast traffic of a certain multicast group. In general, IGMP is a communications protocol used by hosts and adjacent routers to establish multicast group members. In the example of FIG. 1, IGMP operates between receivers 18 and CE-LHRs 22A-22B, and CE-LHRs 22A-22B may each be configured to use IGMP to communicate with receivers 18. For example, receivers 18A and 18B send IGMP join requests 30 for joining a multicast group to receive multicast traffic from multicast source 16A.

In the illustrated example, network 2 includes a Multi-Protocol Label Switching (MPLS) core network 10, including network devices that use multicast routing protocols, such as Protocol Independent Multicast (PIM) and a Border Gateway Protocol (BGP), to route multicast traffic through network 10 between multicast sources 16 and multicast receivers 18 for particular multicast groups. In some examples, network 10 may include one or more multicast virtual private networks (MVPNs) to enable multicast traffic to travel between sources and receivers, e.g., sources 16 and receivers 18, within remote customer sites. The MVPNs may be established between PE routers 20 of network 10. As shown, after being signaled by PE router(s) 20C, 20D that there are interested receivers for multicast source 16A (discussed in further detail below), PE routers 20A and 20B may send PIM join requests 36 o CE 22C indicating they have interested receiver(s) for multicast source 16A. The PIM protocol may operate in several different modes, including Dense Mode (DM), Sparse Mode (SM) in Source- Specific Multicast (SSM) mode or Any Source Multicast (ASM) mode, and Bidirectional (BIDIR) mode. Additional information regarding PIM protocols may be found in Adams, A., et al., "Protocol Independent Multicast Version 2—Dense Mode Specification," RFC 3973, 2005; Fenner, B., et al., "Protocol Independent Multicast-Sparse Mode (PIM-SM): Protocol Specification (Revised)," RFC 4601, 2006; Holbrook, H. and B. Cain, "Source-Specific Multicast for IP," IETF RFC 4607, 2006; and Handley, M., et al., "Bidirectional Protocol Independent Multicast (BIDIRPIM)," IETF RFC 5015, 2007, the entire contents of each of which are incorporated by reference herein.

Network 2 includes a plurality of network devices, including a first network device, provider edge (PE) router 20A, and a second network device, PE router 20B, that are both connected to multicast source 16A via CE router 22C. Multicast source 16A is therefore referred to as being "multi-homed" to MPLS core network 10 because multicast traffic from multicast source 16A can reach MPLS core network 10 by multiple ingress PE routers (PE routers 20A and 20B). Multicast source 16B is "single-homed" to MPLS core network 10, because multicast traffic from multicast source 16B can reach MPLS core network 10 by only one ingress PE router 20E. PE routers 20A-20E ("PE routers 20") operate on the edge of MPLS core network 10.

In some cases, CE routers 22A, 22B may be referred to as last hop routers (LHRs) connected to receivers 18. In some examples, receivers 18 are connected to MPLS core network 10 by a layer two (L2) broadcast communication domain such as a local area network (LAN) (e.g., an Ethernet LAN), and each of CE-LHRs 22A, 22B may be physically coupled to the L2 communication domain by a respective LAN interface. In some cases, CE routers 22C, 22D may be referred to as first hop routers (FHRs) connected to multicast sources 16. A typical network topology includes multiple network devices within MPLS core network 10, but for purposes of illustration, these additional network devices are not shown in FIG. 1.

Each of source 16 and receiver 18 may be included in a remote customer site (not shown) that may be a local area network (LAN) or a wide area network (WAN) comprising a plurality of subscriber devices, such as desktop computers, laptops, workstations, PDAs, wireless devices, network-ready appliances, file servers, print servers or other devices. The remote sites may be configured to support multicast traffic, such as Internet Protocol Television (IPTV), desktop conferences, corporate broadcasts, music and video web casts, and other forms of multimedia content.

MPLS core network 10 is a network including unicast upstream multicast hop (UMH) and Selective Provider Tunnels (also referred to herein as "selective tunnels"). Inclusive Provider Tunnels (also referred to herein as "inclusive tunnels") may be configured on the PE routers 20 such that any multicast packet that is sent towards the core will be received by all the PE routers 20 connected to MPLS core network 20 for that MVPN irrespective of whether the PE routers 20 have interested listeners (receivers). That is, when using inclusive provider tunnels an ingress PE device injects multicast traffic in the MVPN by forwarding the traffic on all tunnels regardless of whether a receiver has expressly issued a join for the multicast source and group. For example, any multicast traffic received by ingress PE device 20A from multicast source 16A would be forwarded on respective inclusive tunnels to both PE 20C and 20D. Similarly, any multicast traffic received by ingress PE device 20B from multicast source 16A would be forwarded on respective inclusive tunnels to both PE 20C and 20D. In contrast, Selective Provider Tunnel mode may be configured on PE routers 20 such that traffic sent by a particular PE router is delivered to subset of PE routers in a given MVPN instance that have signaled interested receivers, rather than to all PE routers in the MVPN instance.

In general, network 10 may include MVPN inclusive provider tunnels as single multicast distribution trees configured to carry all multicast traffic from a set of one or more MVPNs. Network 10 may alternatively or additionally include MVPN selective provider tunnels as single multicast distribution trees configured to carry multicast traffic for a set of one or more multicast groups from one or more MVPNs. In one example, the MVPN inclusive tunnels or selective tunnels may be established through network 10 using the PIM protocol.

MVPN auto-discovery may be provided by a unicast routing protocol, such as border gateway protocol (BGP), used to discover and maintain MVPN memberships of PE routers within network 10. BGP MVPN (sometimes referred to as "Next Generation (NG) MVPN") introduces a BGP control plane in the provider network for handling multicast. As described in further detail below, PE routers 20 use BGP control plane messages ("routes") for coordinating delivery of the multicast traffic. BGP MVPN introduces the concept of Provider Multicast Service Interfaces (PMSI) to bring separation between the "service" and "transport" mechanisms. A PMSI is a conceptual "overlay" on the provider network (P-network) that refers to a "service." This "overlay" can take packets from one PE router belonging to a particular MVPN and deliver them to other or all the PE routers belonging to that same MVPN. BGP MVPN is responsible for three major functions: 1. Auto-discovery, 2. P-Tunnel Signaling, and 3. customer multicast (C-MCAST) Route Signaling. Auto-discovery is the process of finding all of the PEs participating in a given MVPN instance. P-Tunnel signaling provides a way for PE routers to tell other PE routers what method they are going to use for transporting C-Multicast traffic (i.e., for establishing the PMSI tunnels). Options for establishing PMSI tunnels (which include inclusive provider tunnels and selective provider tunnels) include point-to-multipoint (P2MP) RSVP-TE, P2MP mLDP, multi-point-to-multipoint (MP2MP) mLDP, multicast Generic Routing Encapsulation (mGRE) or Ingress replication. C-MCAST Route Signaling is a way of exchanging C-Multicast control plane state, such as C-Join, C-Prunes and C-Register messages between relevant PE routers.

BGP MVPN uses selective provider tunnels, or selective provider multicast service interface (S-PMSI), and inclusive provider tunnels, or inclusive provider multicast service interface (I-PMSI). In selective provider tunnels (S-PMSI), traffic sent by a particular PE router is delivered to subset of PE routers in a given MVPN instance, rather than to all PE routers in the MVPN instance. Creating a selective provider tunnel enables an ingress PE router to move high-rate traffic off the inclusive tunnel and deliver the multicast traffic only to receivers that request it. This can improve bandwidth utilization. In accordance with the techniques of this disclosure, PE routers 20 are configured to use the BGP control plane messages for selectively signaling selective provider tunnels based on whether the multicast source is multi-homed to the MVPN network.

PE routers participating in BGP MVPNs that use the BGP control plane use seven types of BGP MVPN routes (messages), five of which are used for auto-discovery and two for C-multicast protocol information exchange between provider edge (PE) routers.

For example, PE routers 20 advertise their MVPN membership to other PE routers 20 using BGP, and PE routers 20 exchange BGP routing protocol messages to advertise various types of routes for controlling multicast distribution within network 2.

For example, in a BGP MVPN, an MVPN type 1 route is an intra-autonomous system (AS) inclusive provider multicast service interface (I-PMSI) auto discovery (AD) route that is originated by all PE routers participating in an MVPN. The MVPN type 1 route includes a route type indicator, an originating router route distinguisher (RD), and an originating router loopback address.

An MVPN type 2 route is an inter-AS I-PMSI AD Route that is originated by all ASBR PE routers. The MVPN type 2 route includes a route type indicator, an originating router RD, and an AS number of the originating ASBR.

An MVPN type 3 route is a selective provider multicast service interface (S-PMSI) AD Route that is originated by the sender PE router (the sender PE that initiates the S-PMSI). The MVPN type 3 route includes a route type indicator, an originating router RD, Customer multicast Source address (C-S) Mask (32 for IPv4; 128 for IPv6), C-S Using S-PMSI, Customer multicast Group address (C-G) Mask (32 for IPv4; 128 for IPv6), C-G Using S-PMSI, and originating Router Loopback Address.

An MVPN type 4 route is a leaf AD Route that is originated by receiver PE routers in response to receiving S-PMSI AD routes with the "leaf information required" flag set from the sender PE router. The MVPN type 4 route includes a route type indicator, an S-PMSI AD route, and an originating router loopback address.

An MVPN type 5 route is a source active AD Route that is originated by the PE router that discovers an active VPN multicast source. The MVPN type 5 route includes a route type indicator, an originating router RD, C-S Mask (32 for IPv4; 128 for IPv6), Customer multicast Source address, C-G Mask (32 for IPv4; 128 for IPv6), Customer multicast Group address.

An MVPN type 6 route is a shared tree join route that is originated by the receiver PE router (the PE that receives a (C-*, C-G) join message from a VPN interface). The MVPN type 6 route includes a route type indicator, RD of Upstream PE (towards Customer Rendezvous Point (C-RP)), AS Number of Upstream PE (towards C-RP), C-RP Mask (32 for IPv4; 128 for IPv6), Customer Rendezvous Point Address, C-G Mask (32 for IPv4; 128 for IPv6), and Customer multicast Group address.

An MVPN type 7 route is a source tree join route that is originated by the receiver PE router (the PE that receives a local (C-S, C-G) join message or the PE that already has a Type 6 route and receives a Type 5 route). The MVPN type 7 route includes a route type indicator, RD of Upstream PE (towards C-S), AS Number of Upstream PE (towards C-S), C-S Mask (32 for IPv4; 128 for IPv6), Customer multicast Source Address, C-G Mask (32 for IPv4; 128 for IPv6), and Customer multicast Group address.

Additional information regarding MVPN may be found in Rosen, E., et al., "Multicast in MPLS/BGP IP VPNs," RFC 6513, February 2012, and Rosen, E., et al., "BGP Encodings and Procedures for Multicast in MPLS/BGP IP VPNs," RFC 6514, February 2012, the entire contents of each of which are incorporated by reference herein.

In the topology shown in FIG. 1, PE router 20C and PE router 20D are egress PE routers to the MPLS core network 10, in that they receive multicast traffic from MPLS core network 20 and forward the multicast traffic towards receivers external to MPLS core network 20. PE router 20A and PE router 20B are ingress PE routers to the MPLS core network 10, in that they receive multicast traffic from outside MPLS core network 20 (initiated by a multicast source 16) and forward it into MPLS core network 20 toward receivers 18. Multicast source 16A (a Customer-Multicast Source) is multi-homed to MPLS core network 10 via a first ingress network device (ingress PE router 20A) and a second ingress network device (ingress PE router 20B). Assume that BGP MVPN is configured to execute on PE router 20A, PE router 20B, PE router 20C, PE router 20D, and PE router 20E in BGP MVPN shared-tree data distribution mode (sometimes referred to as "rendezvous point tree shortest path tree (RPT-SPT) mode"). PE router 20C and PE router 20D are configured with unicast upstream multicast hop (UMH) such that PE router 20C and PE router 20D select the upstream PE routers solely based on their unicast algorithms.

When multicast source 16A begins sending multicast traffic 34, both PE router 20A and PE router 20B will pull traffic and forward the multicast traffic 34 towards MPLS core network 10. In the absence of the techniques of this disclosure, PE router 20C and PE router 20D would receive duplicate data packets from MPLS core network 10 because PE router 20C has no way to determine that PE router 20A and PE router 20B are forwarding traffic for the same multicast flow. PE router 20C would forward the duplicative data packets from both of the upstream PE routers to its downstream receiver 18A. Receiver 18A in turn receives the duplicate data packets, which is not desirable. In multicast, duplicates may be as much of a problem as traffic loss. The same duplicate issue may also happen with PE router 20D receiving traffic from multicast source 16A.

One approach to the issue of duplicates is the "Default UMH approach," but this approach has certain limitations. R. Aggarwal, "BGP Encodings for Multicast in MPLS/BGP IP VPNs," Network Working Group, Internet Draft, July 2006, the entire contents of which are incorporated by reference herein, defines the default UMH selection mechanism in which, for a particular Customer source (C-Src), all the egress PE routers pick the same upstream Ingress PE router based on, say, lowest IP address. This may be undesirable for customers because if the selected Ingress PE router, for some reason, is not able to pull traffic from source, all the egress PE routers will suffer. The egress PE routers might request to source traffic from an Ingress PE router that is nearer to it. By selecting a single PE router by virtue of, say, lowest IP, many egress PE routers might end up sourcing traffic from an Ingress router that is not the nearest one.

If unicast UMH is deployed and other measures such as Sender Based reverse-path forwarding (RPF) is not an option, customers may use selective tunnels to manage duplicates. In general, selective tunnels work to manage duplicates as follows: In the example of FIG. 1, when Ingress PE router 20A (configured with selective tunnel) receives a BGP Type-7 route, ingress PE router 20A sends out a BGP Type-3 route. The interested egress PE routers that have picked PE router 20A as its unicast UMH join this selective tunnel by sending a BGP Type-4 (Leaf AD) route to PE router 20A. In response, ingress PE router 20A tracks and collects all the Type-4 routes that PE router 20A received for the Type-3 route that the ingress PE router 20A sent out. Based on this, a new tunnel (referred to as a "selective tunnel" or "selective provider tunnel") 42A is built, and PE router 20A forwards traffic only on this selective tunnel 42A. Traffic is no longer forwarded on the inclusive tunnel. A similar action is performed by PE router 20B tracking its leaf egresses and building its own selective tunnel 42B.

By virtue of above, PE router 20C will receive traffic only from PE router 20A on selective tunnel 42A and PE router 20D will get traffic only from PE router 20B on selective tunnel 42B. The egress PEs (PE router 20C and PE router 20D) do not need receive duplicates because the selective tunnel carries traffic only to the interested leaf Egress PE routers. In the absence of the techniques of this disclosure, switching to selective tunnel may be performed immediately and without regard to connectivity of the multicast source. However, as described in further detail below, the techniques of this disclosure provide an extension to BGP MVPN operation such that ingress network devices, such as PE routers 20A and 20B, can determine whether the multicast source 16 is multi-homed to the network via the first ingress network device and a second ingress network device before switching to selective tunnels, and continuing to use the inclusive tunnels in response to determining that the multicast source 16 is not yet multi-homed and both receiving the multicast traffic from multicast source 16A.

To further illustrate the problems addressed by the techniques described herein, this section provides an overview of BGP Type-5 routes and describes how Type-5 Source-Active Route works in BGP MVPN shared-tree data distribution mode, in the absence of the techniques of this disclosure. In BGP MVPN shared-tree data distribution mode, when an ingress PE router receives a BGP Type-7 route from the Egress router, the ingress PE router sends out a BGP Type-5 route. This BGP Type-5 route, also called Source-Active Route, indicates that the ingress router has switched to the SPT (PIM Shortest Path Tree). When a PE router hosting a customer rendezvous point (C-RP) in its site receives this Type-5 route, the PE router stops forwarding over the shared tree. This BGP Type-5 route is received by all the other PE routers and installed in their routing information table. Typically, this Type-5 route is processed only by the PE router which hosts the C-RP in its site, and the other PE routers do not process this Type-5 route. That is, this type-5 route will be received by other PEs (that are not connected to the C-RP), but, no meaningful action is prescribed with this route. This Type-5 route just remains in the BGP-MVPN route table but, no MVPN action is performed.

When an ingress PE router (such as PE routers 20A, 20B) coupled to a multicast source 16 receives routing protocol message advertising a BGP Type-7 route 38 from an egress router (such as PEs 20C, 20D), the ingress PE router generates and sends a routing protocol advertisement advertising a BGP Type-5 route 40. In accordance with the techniques of this disclosure, the ingress PE router is configured to process the Type-5 routes 40 received from other ingress PE routers to detect if the multicast source 16 (C-Source) is multi-homed or not depending on whether another Type-5 route was previously received from another ingress PE router specifying the same multicast source and group. Based on this detection by presence of a Type-5 route from at least one another ingress PE router for the multicast source and group, the ingress router can switch to selective tunnels, such that traffic sent by a particular PE router is delivered to subset of PE routers in a given MVPN instance that have sent BGP MVPN type-4 routes, rather than to all PE routers in the MVPN instance.

In the absence of the techniques of this disclosure, ingress PE routers 20A, 20B would immediately switch to use of selective tunnels to avoid duplicates packets. With the techniques of this disclosure, each of ingress PE routers 20A, 20B switch to using selective tunnels only after receiving a Type-5 route from another Ingress PE router that indicates that the particular source (e.g., multicast source 16A or 16B) is multi-homed.

When an ingress PE router 20A or 20B receives a Type-7 route 38 and the ingress PE router determines based on its routing information tables that it already has received a Type-5 route 40 received from another ingress PE router, the ingress router will switch to using S-PMSI (selective provider tunnel). An ingress PE router 20A or 20B initiates setup of a selective tunnel by signaling a Type-3 route, and building a selective tunnel based on the Type-4 routes received, and stops forwarding on the inclusive tunnel. When an ingress PE router receives a Type-7 route and the ingress PE router does not have any other Type-5 route from other PE routers, the ingress PE router will continue to operate using the inclusive tunnel, thus saving state and routes in the network 10.

In this way, FIG. 1 illustrates the ingress PE routers 20A, 20B switching to selective tunnels 42 based on detecting Type-5 routes 40 from another PE router. As discussed above, in the topology shown in FIG. 1, multicast source 16A is multi-homed to PE router 20A and PE router 20B. Moreover, in this detailed example, egress PE router 20C sends Type-7 route 38 to PE router 20A, i.e., a source tree join route message specifying a multicast source and a multicast group. In response, PE router 20A sends out a Type-5 route 40 (source active auto-discovery route message), and in accordance with the techniques of this disclosure, checks its routing table to determine whether any other type-5 routes from other ingress PE routers for the multicast source and multicast group specified in the type-7 route 38 received from egress PE router 20C. At this point, there are no other Type-5 routes in the network. In response to determining that no other type-5 routes were received, PE router 20A refrains from setting up a selective provider tunnel (even though it has received a type-7 route from PE router 20C, which would normally trigger setup of the selective tunnel in the absence of the techniques of this disclosure), and forwards multicast traffic for the multicast source and group on an inclusive tunnel, thus saving system and network resources.

Sometime later, in the example of FIG. 1, PE router 20D sends a Type-7 route 38 to PE router 20B. As such, PE router 20B also sends out a Type-5 route 40 and has already received the Type-5 route 40 sent by PE router 20A. Based on determining this by checking its routing table in response to receiving the type-7 route 38 from PE router 20B, PE router 20B switches to using selective tunnels immediately, by initiating setup of a selective provider tunnel 42B to the egress network device PE router 20D and terminating forwarding the multicast traffic on the inclusive provider tunnel to PE router 20D.

Further, when PE router 20A receives the Type-5 route 40 from PE router 20B, PE router 20A will, based on its routing table, determine that multicast source 16A is multi-homed and will switch to using selective tunnels in response, thus initiating setup of selective provider tunnel 42A. By virtue of using selective tunnels, duplicate multicast traffic in MPLS core network 10 is avoided and in turn the egress network devices are not forwarding duplicate traffic to multicast receiver 18A.

FIG. 2 is a block diagram illustrating a second example in which ingress router PE 20E applies the techniques described herein and remains using inclusive tunnel mode so as to continue to use inclusive tunnels based on, for example, absence of other Type-5 routes indicating multi-homed connected for multicast source 16B by at least one other PE router. In the topology of FIG. 2, multicast source 16B is single-homed to PE router 20E. In this example, PE router 20C sends Type-7 route 38 to PE router 20E, specifying multicast source 16B and a multicast group. PE router 20E sends a Type-5 route 40 in response. At this point, PE router 20E, based on its routing table, determines that multicast source 16B is single-homed to MPLS core network 10 because no other Type-5 routes have been received for multicast source 16B in the network. PE router 20E forwards traffic received for multicast source 16B and a multicast group on an inclusive tunnel, thus potentially saving system and network resources.

Sometime later, PE router 20D sends another Type-7 route 38 to PE router 20E. PE router 20E again determines that multicast source 16B is single-homed to MPLS core network 10 because there are still no other Type-5 routes received for multicast source 16B in the network. So, PE router 20E will continue to remain in inclusive tunnel, as shown in FIG. 2, and continues to forward multicast traffic for the multicast source 16B and multicast group on an inclusive provider tunnel without initiating setup of a selective provider tunnel to the egress network device PE router 20D, even though PE router 20E received a type-7 route from PE router 20D.

In some examples, an ingress PE router that has switched to use of a selective tunnel can revert to inclusive tunnel operation, in response to determining that all the Type-5 routes that were earlier received are later withdrawn by way of BGP routing advertisements and, therefore, removed from its routing table. In some examples, an additional condition may be added before the ingress PE router reverts to Inclusive tunnel, such as waiting until after configured time has elapsed before switching back to the selective tunnel, to avoid churning of states in case another Type-5 route is received within the time period.

The techniques described herein may be easily implementable, as new functionality has to be added only on the Ingress PE routers to process the Type-5 routes and intelligently switch to Selective tunnel. No other control plane changes are necessary. The solution may be simple to operate and manage. This does not require any extra support in hardware in egress PE routers, unlike Sender Based RPF. This does not need any upgrades or code changes on the egress PE routers. Scaling benefits may be extensive in terms of number of routes, states and the complexity involved in switching all flows at once, even when the sources are not multi-homed.

The techniques of this disclosure avoid the scaling problems that occur with creating selective tunnels even for single-homed multicast sources. Based on the description of Selective tunnels above, we can see that for a particular flow of (C-S, C-G), separate BGP signaling is needed in the form Type-3 and Type-4. Selective Tunnels are typically configured on the ingress router today and are applicable to all flows, because the customer does not know in advance as to which particular multicast sources are multi-homed. By virtue of this, in the absence of the techniques of this disclosure, even when the multicast source of the flows is single-homed, the ingress routers often create selective tunnels even though there are no possibilities of duplicates. Selectively allowing multicast flows that are single-homed to remain on inclusive tunnels as described herein, may benefit in terms of states on routers, BGP routes (Type-3 and Type-4), code complexity and fewer forwarding next hops.

Typically, in customer deployments, few customer multicast flows end up being multi-homed. Two reasons for this: (a) Many C-Sources are itself homed on only one PE. (b) For many C-sources, all Egresses pick the same upstream Ingress PE router by virtue of its unicast UMH. In both the above cases, there is no possibility of traffic duplicates. Customers might desire redundancy for only a few flows, and to avoid duplicates for these flows, they configure Selective tunnels. This has an adverse effect in triggering Selective tunnels for all flows and causing state and route explosion on all routers, potentially in Ingresses, Egresses and Route-Reflectors.

Table I below shows a typical deployment scenario where selective tunnels are used and the states that are created on the network.

TABLE 1

| Deployment feature | States created on network |
|---|---|
| Number of customer mcast flows in the network for all VRFs, i.e., number of (C-S, C-G)s | 100K |
| Average number of Egress routers | 100 |
| BGP routes needed for S-PMSI for 1 flow | 1 Type-3 and 100 Type-4 (because of 100 egresses) = 100 |
| BGP routes needed for S-PMSI for 100K flows | 100 * 100K = 10M |
| If there are 10 ingress PEs, each PE will take about 1M route increase because of S-PMSI | Even Route-Reflectors have to scale up to 100M routes for BGP MVPN |
| For each of the 100K flows on the ingress, separate forwarding and tunnel information has to be maintained | If only 10% of the flows are actually capable of causing duplicates, still end up with 10M routes in the network |

The techniques of this disclosure provide the ability of the Ingress PE routers to determine if there are other Ingress PE routers capable of forwarding traffic for the particular flow in question and based on this detection, switching to the Selective tunnels as needed. The techniques of this disclosure provide a way for the ingress PE routers to detect whether a particular C-Source is multi-homed and based on this detection, the ingress PE routers can either remain in Inclusive Tunnels (if the C-Source is single-homed or effectively single homed in that all egress PE routers pick a single ingress PE router as their UMH) or switch to selective tunnels (if the C-Source is multi-homed and the Egress PE routers pick different ingress PE routers as their UMH).

If an ingress PE router, say PE router 20A, detects that there are no other ingress PE routers homing the C-Source (source 16A), PE router 20A can remain forwarding on the Inclusive Tunnel mode, thus avoiding the need to store a lot of state. Later if PE router 20A detects that another Ingress PE router, say PE router 20B, is also about to forward traffic for this flow then, PE router 20A can switch to Selective Tunnel.

Similarly, if PE router 20A detects that PE router 20B goes away and PE router 20A is the only Ingress PE router 20A, in response PE router 20A can choose to switch back from Selective Tunnel to Inclusive Tunnel, thus removing redundant states. This feature is optional and typically the switching back may be performed after some configurable time period has elapsed.

Table II describes an example estimated reduction in scale in number of routes and states based on the detection of multi-homing by Ingress PE routers.

TABLE II

|  | Typical S-PMSI behavior | S-PMSI scale after detection of multi-homed sources |
|---|---|---|
| Number of customer mcast flows in the network for all VRFs, i.e., number of (C-S, C-G)s | 100K | 100K |
| Average number of Egress routers | 100 | 100 |
| BGP routes needed for S-PMSI for 1 flow | 1 Type-3 and 100 Type-4 (because of 100 egresses) = 100 | 1 Type-3 and 100 Type-4 (because of 100 egresses) = 100 |
| If only 10% of the flows are actually capable of causing duplicates: | | |
| BGP routes needed for S-PMSI for 10K flows | 100 * 100K = 10M | 100 * 10K = 1M |
| If there are 10 ingress PEs, each PE will take about 1M route increase because of S-PMSI | Even Route-Reflectors have to scale up to 100M routes for BGP MVPN | Route-Reflectors' scale comes down to 1M |
| For each of the 100K flows on the ingress, separate forwarding and tunnel information has to be maintained | If only 10% of the flows are actually capable of causing duplicates, still end up with 10M routes in the network | If only 10% of the flows are actually capable of causing duplicates, we save about 90% of states in the network |

Figure 3:
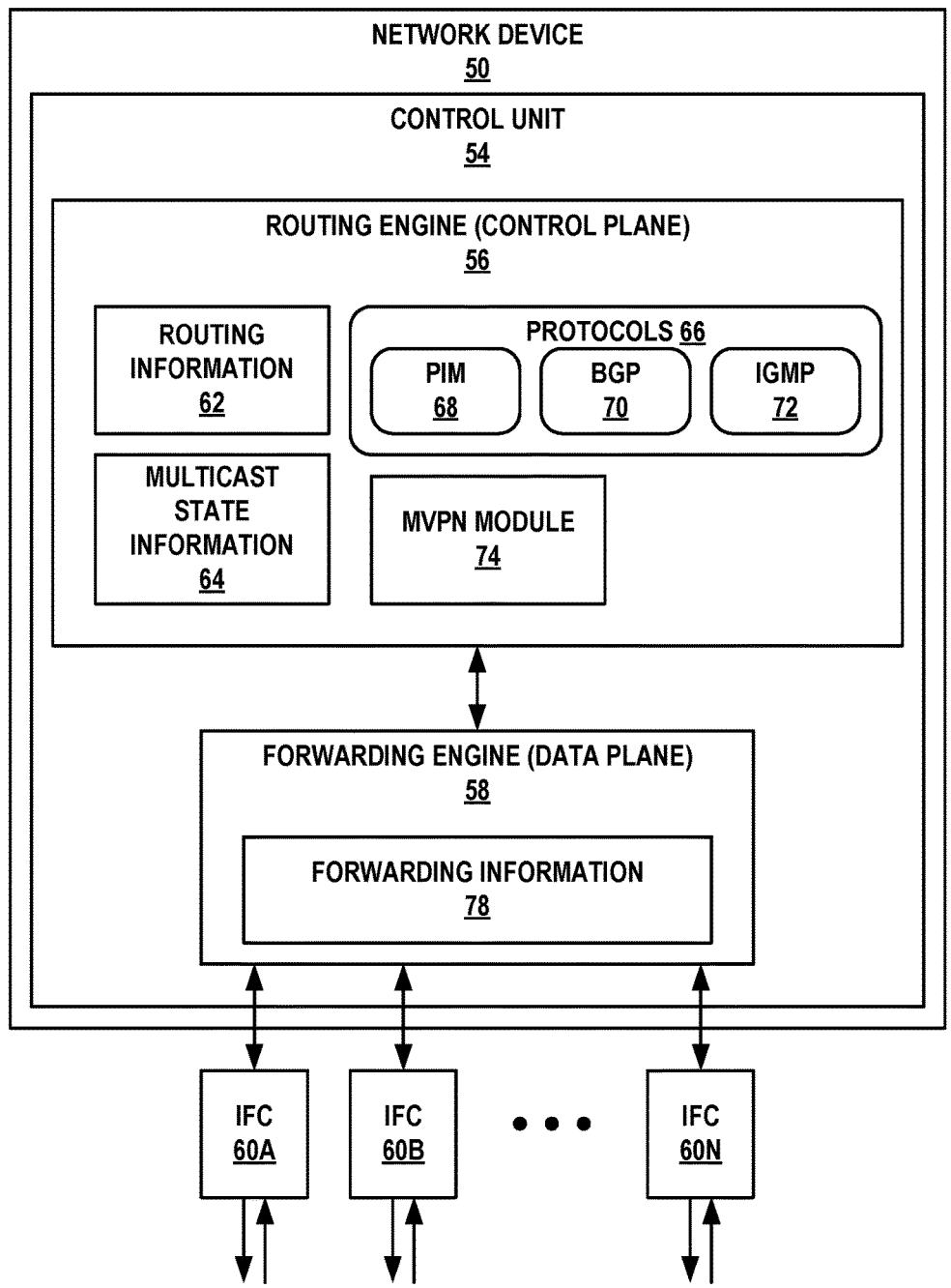
FIG. 3 is a block diagram illustrating an example network device configured to operate in accordance with techniques of this disclosure.

FIG. 3 is a block diagram illustrating an example network device 50 configured to operate in accordance with techniques of this disclosure. In one example, network device 50 may operate as an ingress network device to a core network, such as an MPLS core network. According to the disclosed techniques, as the ingress network device for the core network, network device 50 is configured to selectively establish selective tunnels when network device 50 determines that a particular multicast source and group is multi-homed to the core network via network device 50. For example, network device 50 may operate substantially similar to ingress PE routers 20A and 20B from FIGS. 1 and 2.

In the illustrated example of FIG. 3, network device 50 includes interface cards 60A-60N ("IFCs 60") that receive control and data packets via incoming links and send control and data packets via outbound links. IFCs 60 are typically coupled to the incoming links and the outbound links via a number of interface ports. Network device 50 also includes a control unit 54 that determines routes of received packets and forwards the packets accordingly via IFCs 60.

Control unit 54 includes a routing engine 56 and a forwarding engine 58. Routing engine 56 operates as the control plane for router 50 and includes an operating system (not shown) that may provide a multi-tasking operating environment for execution of a number of concurrent processes. For example, routing engine 56 provides an operating environment for various protocols 66 that perform routing functions for network device 50. In the illustrated example of FIG. 3, routing engine 56 includes a border gateway protocol (BGP) module 70 as a unicast routing protocol used to exchange routing information with other network devices in a network in order to discover the network topology and update routing information 62, and sending routes for MVPN auto-discovery, provider tunnel signaling, and customer multicast route signaling. In addition, routing engine 56 includes PIM module 68 as a multicast routing protocol used to build multicast distribution trees with the other network devices in the network using routing information 62 and multicast state information 64.

Routing engine 56 also includes IGMP 72 as a communications protocol used to establish multicast group memberships with IGMP hosts, e.g., receivers and sources, within customer sites external to the network. In some examples, routing engine 56 may receive IGMP report messages identifying a multicast group and, in some cases, a source of the multicast group in which an IGMP host is interested. Routing engine 56 may, in some examples, use PIM module 68 to generate the multicast control messages (e.g., PIM join messages and/or PIM prune messages) used to build the multicast distribution trees in the network.

Routing information 62 may describe the topology of the network in which network device 50 resides, and may also describe various routes within the network and the appropriate next hops for each route, i.e., the neighboring network devices along each of the routes. Routing information 62 may include a list of incoming interfaces (IIFs) and a list of outgoing interfaces (OIFs) that indicate which of IFCs 60 are connected to the neighboring network devices in each route. For example, a given route may comprise a multicast route for multicast traffic of a given multicast group. In that example, the list of IIFs included in routing information 62 may include a list of upstream interfaces for all upstream neighbor network devices that have state for the given multicast group, and the list of OIFs included in routing information 62 may include a list of downstream interfaces for all downstream neighbor network devices that have state for the given multicast group.

Multicast state information 64 may describe a current status of interfaces for the neighboring network devices in the multicast distribution trees established using PIM module 68. For example, multicast state information 64 may include multicast state (e.g., PIM join state and PIM prune state) for each different multicast group within a range for a given multicast distribution tree. More specifically, for each multicast group, multicast state information 64 may include upstream and downstream interfaces toward neighboring network devices that belong to the respective multicast group.

MVPN module 74 may be configured to establish and maintain MVPN distribution trees or tunnels within the network using one or both of PIM module 68 and BGP module 70. In cooperation with MVPN module 74, BGP module 70 sends and receives MVPN-related route messages, and may forward receive messages to MVPN module 74 for processing. In addition, MVPN module 74 may map MVPN membership information of other network devices within the network and generate multicast state for a given MVPN based on the MVPN membership information. In some examples, MVPN module 74 may store multicast state for one or more MVPNs in multicast state information 64. For example, MVPN module 74 may store to multicast state information 64 or routing information 62 information indicating when BGP type-5 routes have been received for particular multicast (S,G), and may subsequently update multicast state information 64 or routing information 62 to remove entries when the type-5 routes have been withdrawn.

Routing engine 56 analyzes routing information 62 and multicast state information 64 to generate forwarding information 78 installed in forwarding engine 58. Forwarding engine 58 provides data plane functionality for network device 50. Although not shown in FIG. 3, forwarding engine 58 may comprise a central processing unit (CPU), memory and one or more programmable packet-forwarding application-specific integrated circuits (ASICs). Forwarding information 78 associates network destinations with specific next hops and corresponding ports of IFCs 60.

According to the techniques of this disclosure, when network device 50 receives a source tree join route message from an egress network device of the network, the source tree join route message specifying a multicast source (e.g., a BGP MVPN type 7 route), the MVPN type 7 route is passed to MVPN module 74. In response to receiving the source tree join route message, MVPN module 74 determines whether the network device 50 has previously received a source active auto-discovery route message (e.g., BGP MVPN type 5 route) indicating that a second ingress network device discovered the multicast source (network device 50 being the first). For example, MVPN module 74 performs a lookup in multicast state information 64 (or routing information 62) based on the multicast source and group to check whether there is information indicating that a source active auto-discovery route message was previously received by another ingress network device that has not since been withdrawn. In response to MVPN module 74 determining that the source active auto-discovery route message was not previously received by network device 50 (or was received but has since been withdrawn), MVPN module 74 remains in an inclusive provider tunnel mode without initiating setup of a selective provider tunnel to the egress network device from which the MVPN type 7 route was received. In response to MVPN module 74 determining that the source active auto-discovery route message was previously received, MVPN module 74 initiates setup of a selective provider tunnel to the egress network device.

To initiate setup of the selective provider tunnel, network device 50 has to inform the receiver PE routers 20 that network device 50 is going to use a new selective provider tunnel (P-Tunnel) for the (C-S,C-G) and the interested Receiver PE routers 20 need to join the new P-Tunnel. Then the network device 50 as the source PE router switches C-Multicast data over to the new P-Tunnel. For example, network device 50 will send another BGP Route Type 3 (S-PMSI) advertisement to all the PE routers 20 announcing itself as the root of new P-Tunnel that will transport traffic for the (C-S,C-G). After receiving this update, PE routers 20 with interested receivers will join the new P-Tunnel (P2MP mLDP). Network device 50 will then switch the multicast traffic for (C-S,C-G) from the inclusive provider tunnel (I-PMSI) (Default MDT) to the selective provider tunnel (S-PMSI) (Data MDT), which means that only PE routers 20 with interested receivers will receive the traffic.

MVPN module 74 may subsequently determine that a formerly multi-homed multicast source is no longer multi-homed (i.e., that network device 50 is the only remaining ingress network device for the multicast source and group). For example, MVPN module 74 may process a message from another ingress device withdrawing a route (e.g., a type-5 route withdraw message that indicates the advertising PE router is no longer able to reach the source or pull traffic from the source), or may periodically check multicast state information 64 to determine. In response to determining that a multicast source is no longer multi-homed, MVPN module 74 tears down the selective tunnels and reverts to using an inclusive provider tunnel. That is, network device 50 terminates forwarding the multicast traffic on the selective provider tunnel and resumes forwarding the multicast traffic on the inclusive provider tunnel. For example, to tear down the selective tunnel, the Ingress PE router withdraws the Type-3 route and egress PE routers withdraw their Type-4 route. The inclusive provider tunnel is already in place.

In some examples, MVPN module 74 may be configured such that in response to determining that a multicast source is no longer multi-homed, MVPN module 74 will wait a configured time period before tearing down the selective tunnels and reverting to the inclusive tunnel mode. If MVPN module 74 determines that a source tree join route is subsequently received within the time period for the multicast source (prior to expiration of the configured time period), MVPN module 74 remains in the selective tunnel mode (continues to forward multicast traffic onto the selective tunnel) and does not tear down the selective tunnel. As one example, the MVPN module 74 may wait a time period such as 3 minutes. If the time period expires and no source tree join route has yet been received for that multicast source, MVPN module 74 terminates forwarding the multicast traffic on the selective provider tunnel and resumes forwarding the multicast traffic on the inclusive provider tunnel, and tears down the selective tunnels for the multicast source and group. This may help avoid unnecessary churn in the network due to tearing down and re-establishing tunnels.

The architecture of network device 50 illustrated in FIG. 3 is shown for exemplary purposes only and should not be limited to this architecture. In other examples, network device 50 may be configured in a variety of ways. In one example, some of the functionally of control unit 54 may be distributed within IFCs 60. Control unit 54 may be implemented solely in software, or hardware, or may be implemented as a combination of software, hardware, or firmware. For example, control unit 54 may include one or more processors which execute software instructions. In that case, the various software modules of control unit 54 may comprise executable instructions stored on a computer-readable medium, such as computer memory or hard disk.

Figure 4:
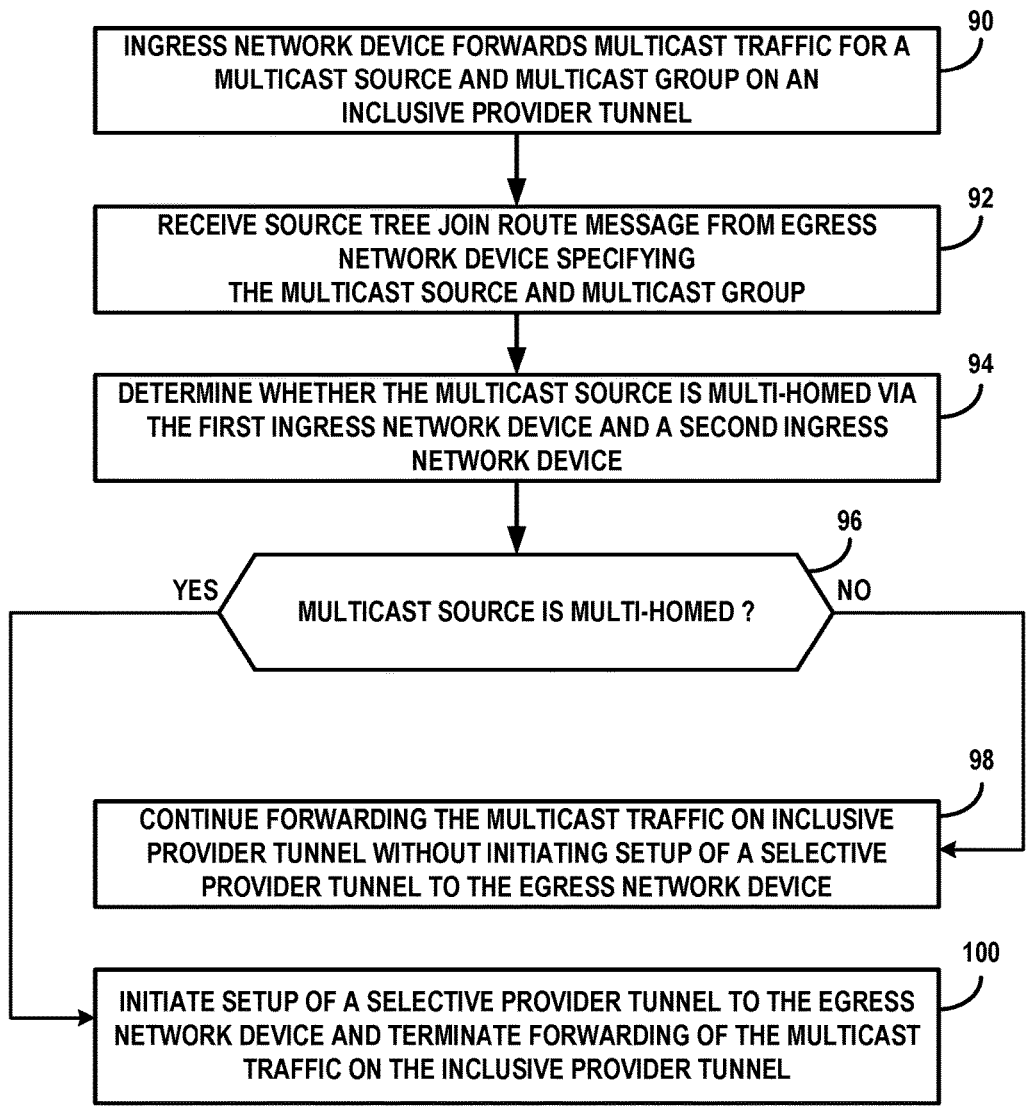
FIG. 4 is a flowchart illustrating an example operation of a network device switching to selective tunnel based on detecting that a multicast source is multi-homed via multiple ingress network devices, in accordance with the techniques of this disclosure.

FIG. 4 is a flowchart illustrating an example operation of a network device switching to using selective tunnels based on detecting that a multicast source is multi-homed via multiple ingress network devices, in accordance with the techniques of this disclosure. FIG. 4 is described for purposes of example with respect to network device 50 of FIG. 3, but is also applicable to FIGS. 1-2 and may represent example operation of any of ingress network devices 20A and 20B. An ingress network device (e.g., network device 50) initially operates in inclusive provider tunnel mode with respect to a multicast source and multicast group, whereby the ingress network device forwards multicast traffic received for a multicast source and multicast group on an inclusive provider tunnel (90).

Network device 50 receives a source tree join route message from an egress network device specifying a multicast source and multicast group (92). In response to receiving the source tree join route message, network device 50 determines whether the multicast source is multi-homed to the network via network device 50 as a first ingress network device, and at least a second ingress network device (94). For example, MVPN module 74 of network device 50 may determine whether network device 50 previously received a source active auto-discovery route message indicating a second ingress network device also discovered the multicast source. For example, the ingress PE router may look up the multicast source, group in multicast state information 64 or routing information 62.

In response to determining that the multicast source is multi-homed to the network (YES of 96), (e.g., network device 50 did previously receive a source active auto-discovery route message (BGP type-5 message) from a second ingress network device indicating the second ingress network device previously discovered the multicast source and multicast group, network device 50 switches to a selective provider tunnel mode in which the ingress PE router initiates setup of a selective provider tunnel to the egress network device from which the source tree join route message was received in step 90 (100), terminating forwarding the multicast traffic on the inclusive provider tunnel, and begins forwarding multicast traffic from the multicast source and group on the newly established selective provider tunnel. In response to determining that the multicast source is single-homed to the network (not multi-homed), i.e., determining that the multicast state information 64 indicates the ingress PE router did not previously receive source active auto-discovery route message from a second ingress network device having previously discovered the multicast source and group (NO of 96), network device 50 remains in the inclusive provider tunnel mode, i.e., continues to forward the multicast traffic for the multicast source and group on the inclusive provider tunnel to the egress network device without initiating setup of a selective provider tunnel to the egress network device from which the source tree join route message was received (98).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described in this disclosure. These and other examples are within the scope of the following claims.

What is claimed is:

1. A method comprising:
    receiving, by a first ingress network device for a network, a source tree join route message from an egress network device for the network, the source tree join route message specifying a multicast source and a multicast group;
    in response to receiving the source tree join route message, determining, by the first ingress network device, whether the multicast source is multi-homed to the network via the first ingress network device and a second ingress network device for the network;
    in response to determining that the multicast source is not multi-homed to the network, forwarding, by the first ingress network device, multicast traffic for the multicast source and multicast group on an inclusive provider tunnel without initiating setup of a selective provider tunnel to the egress network device; and
    in response to determining that the multicast source is multi-homed to the network, initiating, by the first ingress network device, setup of a selective provider tunnel to the egress network device and terminating forwarding the multicast traffic on the inclusive provider tunnel to the egress network device.

2. The method of claim 1, wherein determining that the multicast source is multi-homed to the network via the first ingress network device and the second ingress network device comprises determining whether the first ingress network device has previously received a source active auto-discovery route message indicating that the second ingress network device for the network has discovered the multicast source.

3. The method of claim 2, wherein determining that the multicast source is not multi-homed to the network comprises determining that the source active auto-discovery route message was not previously received by the first ingress network device.

4. The method of claim 2, wherein the source tree join route message comprises a Border Gateway Protocol (BGP)

multicast virtual private network (MVPN) type 7 route, and wherein the source active auto-discovery route message comprises a BGP MVPN type 5 route.

5. The method of claim 2, wherein the source tree join route message specifies a customer multicast source address for the multicast source and a customer multicast group address for the multicast group, and wherein the source active auto-discovery route message specifies the customer multicast source address for the multicast source and the customer multicast group address for the multicast group.

6. The method of claim 1, wherein initiating setup of the selective provider tunnel to the egress network device comprises sending, by the first ingress network device, a selective provider multicast service interface (S-PMSI) route announcing the first ingress network device as a root of the selective provider tunnel that will transport traffic for the multicast source.

7. The method of claim 1, further comprising:
in response to determining, by the first ingress network device, that the multicast source is no longer multi-homed to the network via the first ingress network device and the second ingress network device, terminating forwarding the multicast traffic on the selective provider tunnel and resuming forwarding the multicast traffic on the inclusive provider tunnel.

8. The method of claim 7, further comprising:
wherein terminating forwarding the multicast traffic on the selective provider tunnel and resuming forwarding the multicast traffic on the inclusive provider tunnel comprises waiting a configured time period after determining, by the first ingress network device, that the multicast source is no longer multi-homed to the network via the first ingress network device and the second ingress network device, and terminating forwarding the multicast traffic on the selective provider tunnel and resuming forwarding the multicast traffic on the selective provider tunnel if the multicast source again becomes multi-homed prior to expiration of the configured time period.

9. The method of claim 1, wherein the first ingress network device comprises an ingress provider edge (PE) router that receives the multicast traffic from the multicast source from external to the network and forwards the multicast traffic into the network toward multicast receivers, and wherein the egress network device comprises an egress PE router that receives the multicast traffic from the network and forwards the multicast traffic towards multicast receivers external to the network.

10. A network device comprising:
at least one computer processor; and
a memory comprising instructions that when executed by the at least one computer processor cause the at least one computer processor to:
receive a source tree join route message from an egress network device for a network, the source tree join route message specifying a multicast source and a multicast group;
in response to receiving the source tree join route message, determine whether the multicast source is multi-homed to the network via the network device as a first ingress network device for the network and a second ingress network device for the network;
in response to determining that the multicast source is not multi-homed to the network, forward multicast traffic for the multicast source and multicast group on an inclusive provider tunnel without initiating setup of a selective provider tunnel to the egress network device; and
in response to determining that the multicast source is multi-homed to the network, initiate setup of a selective provider tunnel to the egress network device and terminate forwarding the multicast traffic on the inclusive provider tunnel to the egress network device.

11. The network device of claim 10,
wherein the instructions to determine that the multicast source is multi-homed to the network via the first ingress network device and the second ingress network device further comprise instructions that when executed, cause the at least one computer processor of the network device to:
determine whether the network device has previously received a source active auto-discovery route message indicating that the second ingress network device for the network has discovered the multicast source.

12. The network device of claim 10, wherein the instructions to determine that the multicast source is not multi-homed to the network further comprise instructions that when executed, cause the at least one computer processor of the network device to:
determine that the source active auto-discovery route message was not previously received by the network device.

13. The network device of claim 12, wherein the source tree join route message comprises a Border Gateway Protocol (BGP) multicast virtual private network (MVPN) type 7 route, and wherein the source active auto-discovery route message comprises a BGP MVPN type 5 route.

14. The network device of claim 12, wherein the source tree join route message specifies a customer multicast source address and a customer multicast group address, and wherein the source active auto-discovery route message specifies the customer multicast source address and the customer multicast group address.

15. The network device of claim 10, wherein the instructions to initiate setup of the selective provider tunnel to the egress network device further comprise instructions that when executed, cause the at least one computer processor of the network device to:
send a selective provider multicast service interface (S-PMSI) route announcing the network device as a root of the selective provider tunnel that will transport traffic for the multicast source.

16. The network device of claim 10, wherein the instructions further comprise instructions that when executed, cause the at least one computer processor of the network device to:
in response to determining that the multicast source is no longer multi-homed to the network via the network device and the second ingress network device, terminate forwarding the multicast traffic on the selective provider tunnel and resume forwarding the multicast traffic on the inclusive provider tunnel.

17. The network device of claim 16, wherein the instructions to terminate forwarding the multicast traffic on the selective provider tunnel and resume forwarding the multicast traffic on the inclusive provider tunnel further comprise instructions that when executed, cause the at least one computer processor of the network device to:
wait a configured time period after determining that the multicast source is no longer multi-homed to the network via the network device and the second ingress network device, and terminate forwarding the multicast traffic on the selective provider tunnel and resume forwarding the multicast traffic on the inclusive provider tunnel if the multicast source again becomes multi-homed prior to expiration of the configured time period.

18. The network device of claim 10, wherein the network device comprises an ingress provider edge (PE) router that receives the multicast traffic from the multicast source from external to the network and forwards the multicast traffic into the network toward multicast receivers, and wherein the egress network device comprises an egress PE router that receives the multicast traffic from the network and forwards the multicast traffic towards multicast receivers external to the network.

19. A non-transitory computer-readable storage medium encoded with instructions that, when executed, cause at least one processor of a computing device to:

receive a source tree join route message from an egress network device for a network, the source tree join route message specifying a multicast source and a multicast group;

in response to receiving the source tree join route message, determine whether the multicast source is multi-homed to the network via the computing device as a first ingress network device for the network and a second ingress network device for the network;

in response to determining that the multicast source is not multi-homed to the network, forward multicast traffic for the multicast source and multicast group on an inclusive provider tunnel without initiating setup of a selective provider tunnel to the egress network device; and in response to determining that the multicast source is multi-homed to the network, initiate setup of a selective provider tunnel to the egress network device and terminate forwarding the multicast traffic on the inclusive provider tunnel to the egress network device.

* * * * *